United States Patent [19]

Hardy et al.

[11] 4,123,132

[45] Oct. 31, 1978

[54] SCREW OR NUT AND A CAPTIVE WASHER

[75] Inventors: Paul R. Hardy; Arthur T. Spencer, both of Biggleswade, England

[73] Assignee: PYE (Electronic Products Ltd.), Cambridge, England

[21] Appl. No.: 832,341

[22] Filed: Sep. 12, 1977

[30] Foreign Application Priority Data

Oct. 12, 1976 [GB] United Kingdom ............... 42331/76

[51] Int. Cl.² ............................................. H01R 9/10
[52] U.S. Cl. .................... 339/246; 10/155 R; 85/50 R; 339/263 R
[58] Field of Search .................. 339/242, 246, 263 R, 339/272 A, 176 MP; 151/37; 85/50 R; 10/155 R, 155 A

[56] References Cited

U.S. PATENT DOCUMENTS

| 721,559 | 2/1903 | Goodridge | 339/263 R |
|---|---|---|---|
| 3,144,803 | 8/1964 | Briles | 85/50 R |
| 3,930,706 | 1/1976 | Obuch | 339/176 MP |
| 3,993,397 | 11/1976 | Gutshall | 339/246 |

FOREIGN PATENT DOCUMENTS 1,315 of 1901 United Kingdom ................ 339/263 R Primary Examiner—Joseph H. McGlynn
Attorney, Agent, or Firm—David R. Treacy

[57] ABSTRACT

A captive washer and threaded fastener combination. The washer has a non-planar apertured portion, for passage of a screw shank, which is plastically deformed on first tightening of the fastener. The plastic deformation causes further extending portions of the washer to engage a shoulder on the screw or nut, and hold the washer captive.

8 Claims, 4 Drawing Figures

U.S. Patent  Oct. 31, 1978  Sheet 1 of 2  4,123,132
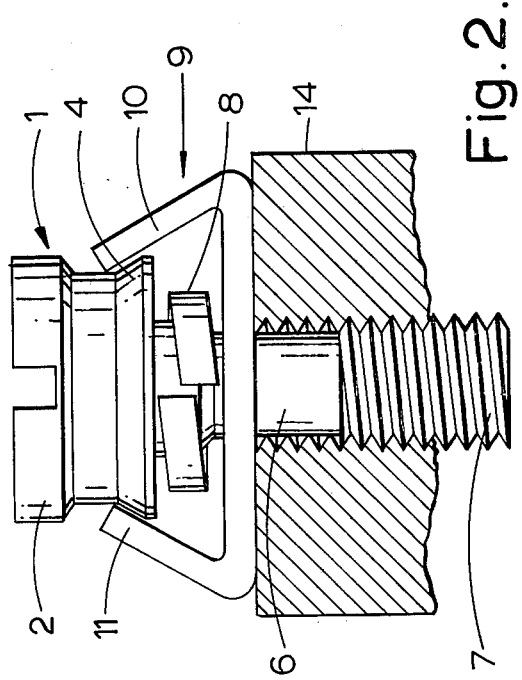
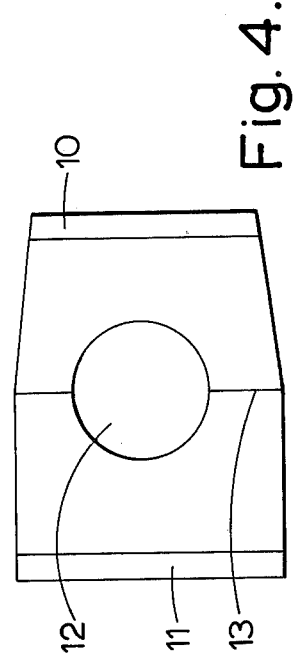
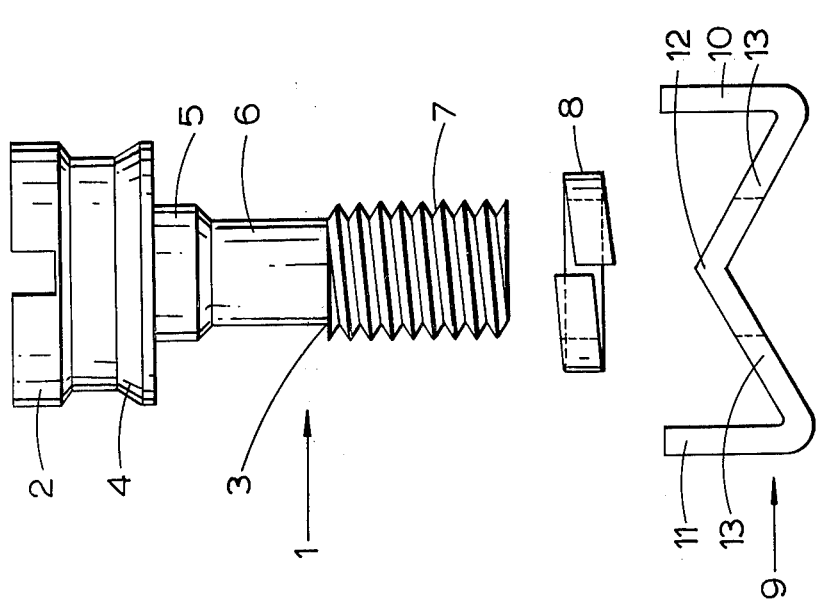

SCREW OR NUT AND A CAPTIVE WASHER

BACKGROUND OF THE INVENTION

1. Field of the Invention

The invention relates to a combination of screw or nut and a captive washer.

The term "screw" is to be understood herein to include any male fastening member having a screwthreaded shank for cooperation with a screwthreaded aperture or recess in a female fastening element, and the term "nut" is to be understood to include any female fastening member having a screwthreaded aperture or recess for cooperation with the screwthreaded shank of a male fastening element. In each case, a clamping surface is provided on the screw or nut for applying an axial clamping force when the screw or nut is tightened.

One application of the invention is to electrical terminals in which a wire is trapped between a body and the captive washer. The washer is provided so that as the nut or screw is tightened the wire is trapped by the axial clamping force exerted by the nut or screw but is subjected to little or no rotational force.

2. Description of the Prior Art

Known screws and nuts having captive washers tend to be relatively complicated to assemble. One example of such an assembly is formed by sliding a washer onto the shank of a screw blank and then rolling a thread on a portion of the shank remote from the screw head. The action of rolling the thread increases the diameter of the shank at the peaks of the thread, thus trapping the washer between the screw head and the threaded portion of the shank. A nut provided with a captive washer is known in which the nut has a circumferential rim over which the circumferential portion of a washer is located by a spinning operation.

SUMMARY OF THE INVENTION

It is an object of the invention to provide an alternative combination of a screw or nut and a captive washer.

The invention provides a combination of a screw or nut and a captive washer, wherein the washer comprises an apertured portion to fit over the shank of the screw or the shank of the male fastening member with which the nut is to cooperate, as the case may be, said portion having a non-planar shape and a construction such that it will be plastically deformed by the clamping force exerted by the screw or nut when the screw or nut is first tightened, and the washer comprising a further portion which is arranged to be deflected towards the axis of the screw or nut by the deformation of the apertured portion of the washer so as to engage over a shoulder on the screw or nut to couple the washer to the screw or nut in the axial direction.

The washer may have a substantially W-shaped cross-section before assembly and be provided with an aperture in the central, inverted V-shaped portion of the W, which portion forms said apertured portion of the washer.

The screw head or nut may have a circular section and be formed with a circumferential groove, a side wall of which forms said shoulder.

The invention further provides an electrical terminal comprising a combination of screw or nut and captive washer according to the invention, and an electrical terminal block including a plurality of these terminals. The terminals may be arranged in a row and a barrier provided between each terminal and its neighbor. The washer of each terminal may be shaped to fit between adjacent barriers so that when the nut or screw of each terminal is tightened the washer is prevented from rotating by engagement with the barriers.

An embodiment of the invention is described, by way of example, with reference to the accompanying drawings.

BRIEF DESCRIPTION OF THE DRAWING

FIG. 1 is an elevation of a combination of screw and captive washer according to an embodiment of the invention before assembly, FIG. 2 is an elevation of the screw and captive washer of FIG. 1, assembled, FIG. 4 is a plan view of a captive washer having a form suitable for use in the terminal block of FIG. 3.

DESCRIPTION OF THE PREFERRED EMBODIMENTS

Figure 3:
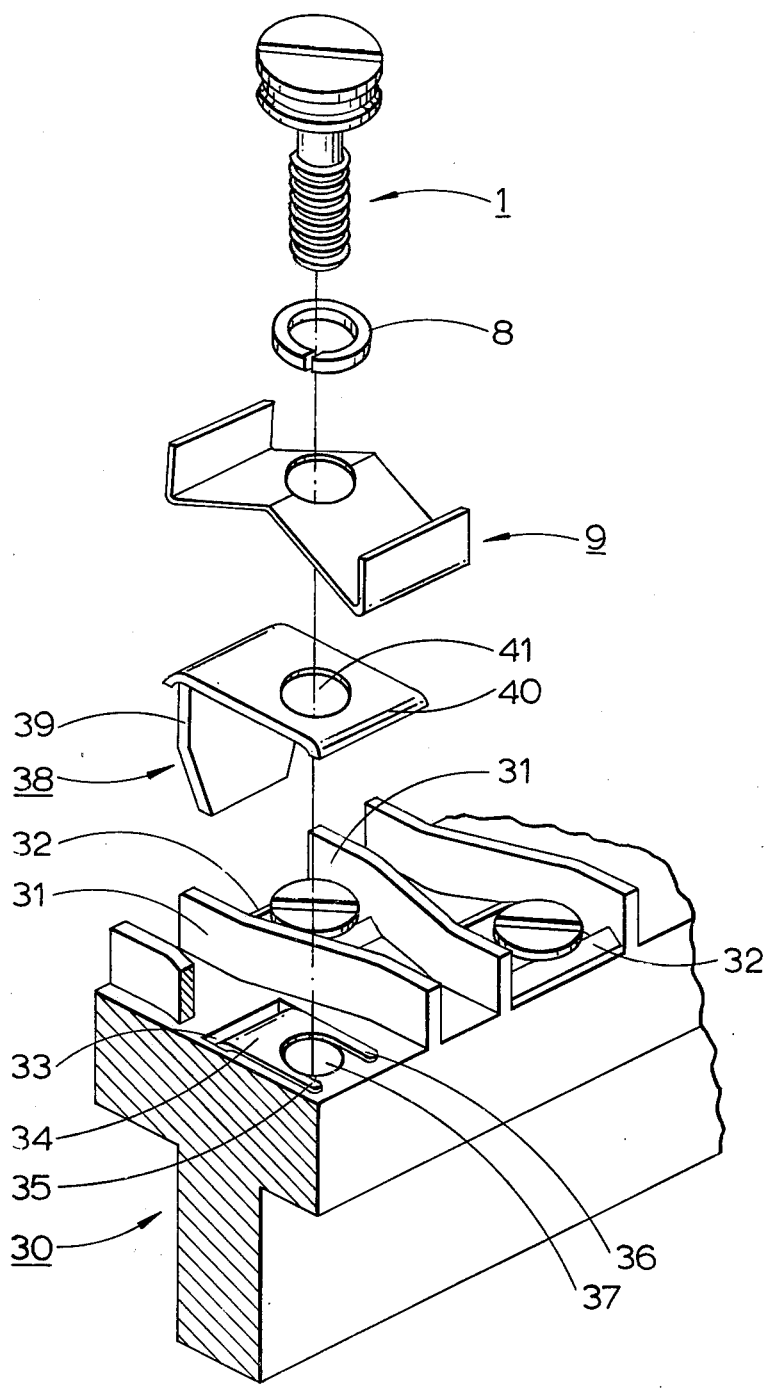
FIG. 3 is an exploded perspective view of a terminal block assembly having terminals each comprising a screw and captive washer as shown in FIGS. 1 and 2.

FIG. 1 shows a screw 1 having a head 2 and a shank 3, the head 2 having a circular cross-section and being provided with a circumferential groove which forms a shoulder 4 on the head 2. The shank 3 has a root portion 5, an unthreaded core portion 6 and a threaded portion 7. The spring washer 8 is of conventional form. A captive washer 9 has a substantially W-shaped cross-section with two outer arms 10 and 11 and is provided with a hole 12 in the central, inverted V-shaped portion 13 of the W, through which hole the shank 3 of the screw can pass with a clearance fit.

To assemble the components shown in FIG. 1, the shank 3 of the screw 1 is passed first through the spring washer 8 and then through the hole 12 in the captive washer 9. As shown in FIG. 2, the screw 1 is then screwed into the threaded aperture in a female fastening member, such as the member 14 in FIG. 2. When the screw is first tightened the W-shaped washer, clamped between the member 14 and the spring washer 8, is plastically deformed so that the central, inverted V-shaped portion 13 becomes flattened and the arms 10 and 11 are deflected inwardly to engage over the shoulder 4 on the head of the screw 1. Provided that the screw is tightened sufficiently for the captive washer 9 to be deformed plastically, i.e., stressed beyond its elastic limit, the washer 9 will remain captive on the screw 1 when the screw is unscrewed.

It is not essential that the screw head 2 has a circular section, but if it is desired that the screw be free to rotate while the captive washer 9 is restrained from rotating, it is necessary that at least the portion of the screw head forming the shoulder 4 and that below the shoulder 4 have a circular section.

The washer 9 shown in FIGS. 1, 2 and 4 is substantially rectangular in plan but other configurations would be possible. The washer 9 could, for example, be circular in plan, domed towards its center and have one or more arms extending from its circumference, which arms would perform the same function as arms 10 and 11 of the washer 9 shown in FIGS. 1, 2 and 4.

The terminal block 30 shown in FIG. 3 has a T-shaped cross-section and is of the type which is arranged as a combination of a printed-circuit board edge connector and screw-type connector. The block has a staggered row of terminals 32 each comprising a screw 1, spring washer 8 and a captive washer 9 of the construction shown in FIGS. 1, 2 and 4. Each terminal 32 is separated from its neighbors by a barrier 31 to reduce the possibility of accidental electrical connection between adjacent terminals. The terminals 32 are staggered to allow closer spacing along the length of the terminal block 30. At each terminal position the block has a slot 33 through which the tail of an electrical contact 34 projects. The tail of the contact 34 has two arms 35 and 36 which are arranged to lie on opposite sides of an associated hole 37 in the terminal block 30. The hole 37 is either internally threaded or fitted with a threaded insert. An under-cleat 38 of generally L-shaped cross-section fits over the contact tail 34 with one leg 39 of the L located in the slot 33. The other leg 40 of the L is provided with a hole 41 which, when the under-cleat 38 is located in the slot 33, is aligned with the hole 37. The respective spring washer 8 and captive washer 9 are fitted on the shank 3 of the respective screw 1, which is then inserted in one of the holes 37 and tightened. As described previously, the W-shaped washer 9 is deformed so that the central portion 13 becomes flattened and the arms 10 and 11 are deflected inwardly to engage over the shoulder 4 on the head of the screw 1. Thus the invention provides a captive washer which is made captive by tightening the screw, or nut as the case may be, in the position where it is to be used. As can be seen from FIG. 4, the washer 9 is shaped to fit between the barriers 31 so that when the screw 1 is rotated the washer 9 is prevented from rotating by engagement with the barriers 31. Thus a wire inserted between the under-cleat 38 and the washer 9 will be trapped by the axial clamping force of the screw 1 when the screw is tightened but there will be no rotational force applied to the wire. In previously known terminal blocks this has been achieved by means of a washer between the screw head and the body of the terminal block but the washers in these previously known terminal blocks were not captive. Non-captive washers tend to become detached from the screw and terminal block when the screw is removed and may be lost.

It would be possible to modify the arrangement shown in FIG. 3 by providing a threaded stud at each terminal position on the terminal block and making the washer 9 captive on a nut. The nut could have a circular cross-section, in which case it would be convenient to knurl the circumference to enable it to be tightened more easily. Alternatively, the upper surface could be castellated to allow a screwdriver blade to be used to tighten it.

When the washer 9 is used in combination with a screw, the shoulder over which the arms of the washer engage could be formed by the peripheral portion of the upper surface of the screw head and the latter provided with a socket in its upper surface to receive a Phillips or Pozidrive screwdriver blade.

What we claim is:

1. A combination of a threaded fastening member and a captive washer, the member having a circumferential shoulder generally perpendicular to an axis defined by the thread of the member, and the captive washer having an apertured portion and a further portion extending from said apertured portion, the combination being adapted for applying clamping pressure between the apertured portion of the captive washer and a clamping surface of a body upon tightening of the threaded member, wherein said apertured portion has a non-planar shape arranged so as to be plastically deformed upon tightening of the threaded fastening member to apply clamping pressure against the clamping surface, said further portion being arranged so as to be deflected toward the axis and engage over said shoulder in response to the plastic deformation, whereby said washer becomes coupled axially to the member upon the first tightening of the member.

2. A combination as claimed in claim 1, wherein the captive washer is a substantially W-shaped cross-section before the plastic deformation, and has an aperture in the central, inverted V-shaped portion of the W, the V-shaped portion being said apertured portion.

3. A combination as claimed in claim 1, wherein the threaded member has a circular section formed with a circumferential groove, the groove having a side wall which defines said shoulder.

4. An electrical terminal screw combination for clamping an electrical connection piece against a surface, comprising a screw having a head and a threaded shank, a circumferential shoulder being formed on the screw head, a captive washer having an apertured portion and a further portion extending from said apertured portion, the apertured portion having a non-planar shape arranged so as to be plastically deformed upon tightening of the screw against the surface, said further portion being arranged so as to be deflected toward the screw axis and engage over said shoulder in response to the plastic deformation, and a spring washer disposed about the screw shank between the head and the captive washer, whereby said captive washer and spring washer become axially coupled to the screw upon first tightening of the screw.

5. A combination as claimed in claim 4 wherein the screw head has a circular section formed with a circumferential groove, the groove having a side wall which defines said shoulder.

6. An electrical terminal assembly comprising a plurality of electrical terminal threaded fastening members; a terminal block having a plurality of screw-threaded elements fixed in block for cooperation with respective fastening members, and a clamping surface on the block adjacent respective elements; and a plurality of captive washers, a captive washer associated with each respective fastening member, each member having a circumferential shoulder generally perpendicular to an axis defined by the thread of the member, and the respective captive washer having an apertured portion and a further portion extending from said apertured portion, a combination of a respective fastening member, captive washer, and screw-threaded element being adapted for applying clamping pressure between the apertured portion of the captive washer and the clamping surface on the block upon tightening of the threaded member, wherein each said apertured portion has a non-planar shape arranged so as to be plastically deformed upon tightening of the respective threaded fastening member to apply clamping pressure against the clamping surface, the respective further portion being arranged so as to be deflected toward the screw axis and engage over the shoulder of the respective fastening member in response to the plastic deformation.

whereby said washers become coupled axially to the respective members upon first tightening of those members.

7. An electrical terminal assembly as claimed in claim 6, wherein said threaded elements are arranged in a row, and said block includes at least one barrier between two adjoining elements.

8. An electrical terminal assembly as claimed in claim 7, wherein said block has a plurality of barriers, each screw-threaded element being disposed between adjacent parallel barriers, and the captive washers are identical and shaped to fit between adjacent barriers to prevent rotation of said washers upon rotation of the threaded members.

* * * * *